(12) United States Patent
Salisbury et al.

(10) Patent No.: US 6,685,819 B2
(45) Date of Patent: Feb. 3, 2004

(54) SYSTEM AND METHOD FOR REMOVING A SOLUTION PHASE METAL FROM PROCESS LIQUOR

(75) Inventors: Bruce A. Salisbury, Farmington, NM (US); Kelly L. Baird, Bloomfield, NM (US); Calvin C. Webb, Bloomfield, NM (US)

(73) Assignee: Pinnacle West Capital Corporation, Phoenix, AZ (US)

( * ) Notice: Subject to any disclaimer, the term of this patent is extended or adjusted under 35 U.S.C. 154(b) by 217 days.

(21) Appl. No.: 09/903,146

(22) Filed: Jul. 10, 2001

(65) Prior Publication Data

US 2003/0010647 A1 Jan. 16, 2003

(51) Int. Cl.[7] .......................... C25B 9/00; C25B 15/00; C25C 1/06; C25C 11/06
(52) U.S. Cl. ...................... 205/349; 205/560; 205/587; 205/347; 204/237; 204/257; 204/263; 204/292
(58) Field of Search ................ 205/347, 349, 205/560, 587; 204/257, 263, 291, 292

(56) References Cited

U.S. PATENT DOCUMENTS

| | | |
|---|---|---|
| 3,884,776 A | 5/1975 | Keidel |
| 4,632,738 A | 12/1986 | Beattie et al. |
| 4,789,434 A * | 12/1988 | Little et al. ................. 204/404 |
| 5,372,683 A * | 12/1994 | Kühn-von Burgsdorff ............... 204/268 X |
| 5,514,263 A * | 5/1996 | Spijkman et al. ........... 205/348 |

OTHER PUBLICATIONS

Controlling SO$_2$ Emissions EPA/600/R–00/093 Nov. 2000.
Emission Control Technologies for Coal–Fired Power Plants, Peoples republic of China Ministry of Electric Power Seminar, Apr. 22–25, 1996.

* cited by examiner

Primary Examiner—Donald R. Valentine
(74) Attorney, Agent, or Firm—Lowell W. Gresham; Jordan M. Meschkow; Meschkow & Gresham, P.L.C.

(57) ABSTRACT

A galvanic cell system (50) in fluid communication with a dewatering system (40) of an inhibited oxidation scrubber (20) removes an oxidation catalyst, i.e., solution phase iron (98), from the process liquor (42) produced by the dewatering system (40) and replaces the iron (98) with magnesium (104) in an oxidation-reduction reaction. An electrolytic cell system (154) in fluid communication with a dewatering system (144) of a forced oxidation scrubber (128) removes an oxidation inhibitor, i.e., solution phase aluminum (174), from the process liquor (146) produced by the dewatering system (144) and replaces the aluminum (174) with iron (170) in an oxidation-reduction reaction. The process liquor (42, 146) is subsequently returned to the scrubber (20, 128) with the solution phase metal (98, 174) selectively removed, thereby enhancing the scrubbing efficiency of the scrubber (20, 128).

31 Claims, 5 Drawing Sheets

SYSTEM AND METHOD FOR REMOVING A SOLUTION PHASE METAL FROM PROCESS LIQUOR

TECHNICAL FIELD OF THE INVENTION

The present invention relates to the field of scrubbers that reduce sulfur emissions from combustion gases of fossil fuels. More specifically, the present invention relates to selectively removing liquid phase metal from the process liquor produced by the scrubbers.

BACKGROUND OF THE INVENTION

The combustion of coal, fuel oil, and petroleum coke in electric power plants produces sulfur dioxide ($SO_2$) flue gas emissions. Left uncontrolled, the emission of high levels of sulfur dioxide into the atmosphere can result in a number of health problems, including respiratory impacts and aggravation of existing cardiovascular disease. In addition, moderate to high levels of sulfur dioxide emissions lead to acid deposition, which can result in degradation of visibility due to the formation of haze, acidification of lakes and streams, damage to the foliage of trees and agricultural crops, and degradation or destruction of buildings and monuments. Considering the health and environmental impacts, most countries place some limits on the allowable levels of uncontrolled sulfur dioxide emissions originating from electric generating facilities.

Power producers therefore are continually seeking cost-effective ways to minimize pollutant formation in the combustion process and to remove pollutants, once they are formed, from the flue gas. The removal of pollutants, such as sulfur dioxide, from the flue gas is typically achieved using flue gas desulfurization (FGD) systems. Wet FGD systems, also referred to as scrubbers, are designed to introduce an alkaline sorbent consisting of lime or limestone in a spray form into the flue gas exhausted by a coal-fired boiler. The alkaline sorbent reacts with the sulfur dioxide in the exhausted flue gas to form inert compounds, such as calcium sulfite ($CaSO_3$) and calcium sulfate ($CaSO_4$). The calcium sulfite or sulfate is allowed to settle out of the water used in the wet FGD scrubber and removed for disposal. Most of the water, also referred to as process liquor, is recycled.

The efficiency of a scrubber to remove sulfur dioxide is a saddle shaped equation. That is, the lowest scrubbing efficiency occurs when a scrubber is at forty to sixty percent oxidation. Oxidation refers to the degree to which the sulfur dioxide that is absorbed by the system is oxidized once it has become soluble in the liquid phase. When the scrubbing efficiency of the scrubber is in the range of forty to sixty percent oxidation, severe gypsum scaling can occur. The scaling limits system reliability and greatly increases maintenance costs.

To correct the problem of scaling, two types of processes to control oxidation have been developed. One process is inhibited oxidation. In this process, the degree to which absorbed sulfur dioxide is oxidized is controlled to a very low level by the addition of an additive to inhibit oxidation. A byproduct produced by inhibited oxidation is calcium sulfite, which is increasingly being used in the production of alpha plaster, a high compressive strength plaster of Paris. The additives commonly used to inhibit oxidation are thiosulfate and elemental sulfur, which reacts to generate thiosulfate.

Another process used to control oxidation is forced oxidation. This process uses air, typically sparged into the reaction or hold-tank of the scrubber by air blowers to maintain high and near-complete oxidation of absorbed sulfur dioxide. A reusable and saleable solid byproduct produced by forced oxidation is calcium sulfate, or gypsum, typically used for plaster, wall board, some cements, fertilizer, paint filler, ornamental stone, and so forth.

Although effective in substantially reducing sulfur from combustion gases, inhibited oxidation and forced oxidation wet scrubbers require a significant portion of a power plant's electrical output, sometimes in the range of six to seven percent. In addition, a wet-scrubber uses thousands of gallons of water to operate. As such, a large installation may consume one hundred to two hundred million gallons of water a month.

In addition, the ability to recycle the process liquor used by a wet FGD scrubber is limited by the amount of large metals in solution in the process liquor. For example, when iron is present in the process liquor from an inhibited oxidation scrubber, the iron acts as an oxidation catalyst by destroying the thiosulfate presence. This leads to plugging of parts of the process, and less than optimum operation of the inhibited oxidation scrubber. Typically, the iron presence in the process liquor is dealt with by "blowing down", or removing the process liquor, from the process and replacing the process liquor with fresh water. Unfortunately, blowing down the process liquor also removes chemicals, such as magnesium salts and alkalinity sources, considered valuable to the inhibited oxidation process.

In contrast, the presence of iron enhances the ability of a forced oxidation scrubber process to form calcium sulfate. However, aluminum in the process liquor undesirably impacts the efficiency of the forced oxidation scrubber. The presence of solution phase aluminum in the process liquor inhibits the ability of calcium to tie up with the absorbed sulfur dioxide to form calcium sulfate. Indeed, the presence of aluminum in the process liquor is a primary reason calling for the use of the air blowers in the forced oxidation process. These air blowers typically consume several megawatts of power.

SUMMARY OF THE INVENTION

Accordingly, it is an advantage of the present invention that a system and method are provided for removing a solution phase metal from process liquor produced by a flue gas desulfurization (FGD) scrubber.

It is another advantage of the present invention that a system and method are provided that achieve savings in terms of energy and water consumption by an FGD scrubber.

It is another advantage of the present invention that a system and method are provided that selectively remove a solution phase metal from the process liquor produced by either of an inhibited oxidation and a forced oxidation scrubber.

Another advantage of the present invention is that a system and method are provided that selectively replace the removed solution phase metal with a desired solution phase metal.

It is yet another advantage of the present invention that a system and method are provided that may be cost effectively implemented within an existing wet FGD scrubber.

The above and other advantages of the present invention are carried out in one form by an electrochemical cell system for removing a solution phase metal from process liquor. The electrochemical cell system includes a first half-cell having a first inlet configured to receive a first portion of the process liquor, and having a first outlet. A cathode at which a reduction reaction occurs with the first portion of the process liquor is in the first half-cell. The first portion of the process liquor is released from the first outlet following the reduction reaction. The electrochemical cell further includes a second half-cell having a second inlet configured to receive a second portion of the process liquor, and having a second outlet. An anode at which an oxidation reaction occurs with the second portion of the process liquor is in the second half-cell. The second portion of the process liquor is released from the second outlet following the oxidation reaction. An electrical circuit is coupled between the cathode and the anode. An ionic conductor section containing an ionic conductor enables a transfer of ions from the ionic conductor into each of the first and second half-cells. The reduction and oxidation reactions form a redox reaction causing the solution phase metal to be removed from one of the first and second portions of the process liquor.

The above and other advantages of the present invention are carried out in another form by a method for removing a solution phase metal from process liquor output from a scrubber. The method calls for establishing an electrochemical cell having a first half-cell, a second half-cell, and an ionic conductor section containing an ionic conductor for enabling a transfer of ions from the ionic conductor into each of the first and second half-cells. The first half-cell has a cathode located therein and the second half-cell has an anode located therein. The anode includes a metal having an electronegativity less than an electronegativity of the ionic conductor. The method further calls for receiving a first portion of the process liquor at the first half-cell, receiving a second portion of the process liquor at the second half-cell, and producing a redox reaction in the electrochemical cell system. The redox reaction causes the solution phase metal to be removed from one of the first and second portions of the process liquor. Following the redox reaction, the first and second portions of the process liquor are combined and the combined process liquor is returned to the scrubber.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

The present invention may be utilized in combination with existing wet flue gas desulfurization (FGD) processes. Wet FGD processes may be generally classified as inhibited oxidation processes and forced oxidation processes. The present invention may be adapted for use in either of the inhibited or forced oxidation processes to selectively remove a solution phase metal from process liquor generated in a slurry dewatering activity and recycled by the FGD process, discussed below.

The present invention is described in connection with each of the inhibited and forced oxidation processes for clarity of illustration. However, it should be understood that the present invention may be adapted to selectively remove solution phase metals from liquor, i.e. an aqueous solution of one or more chemical compounds, generated in other processes, such as that generated in alpha plaster production, solution from acid mine drainage, and so forth.

Inhibited Oxidation Process

Figure 1:
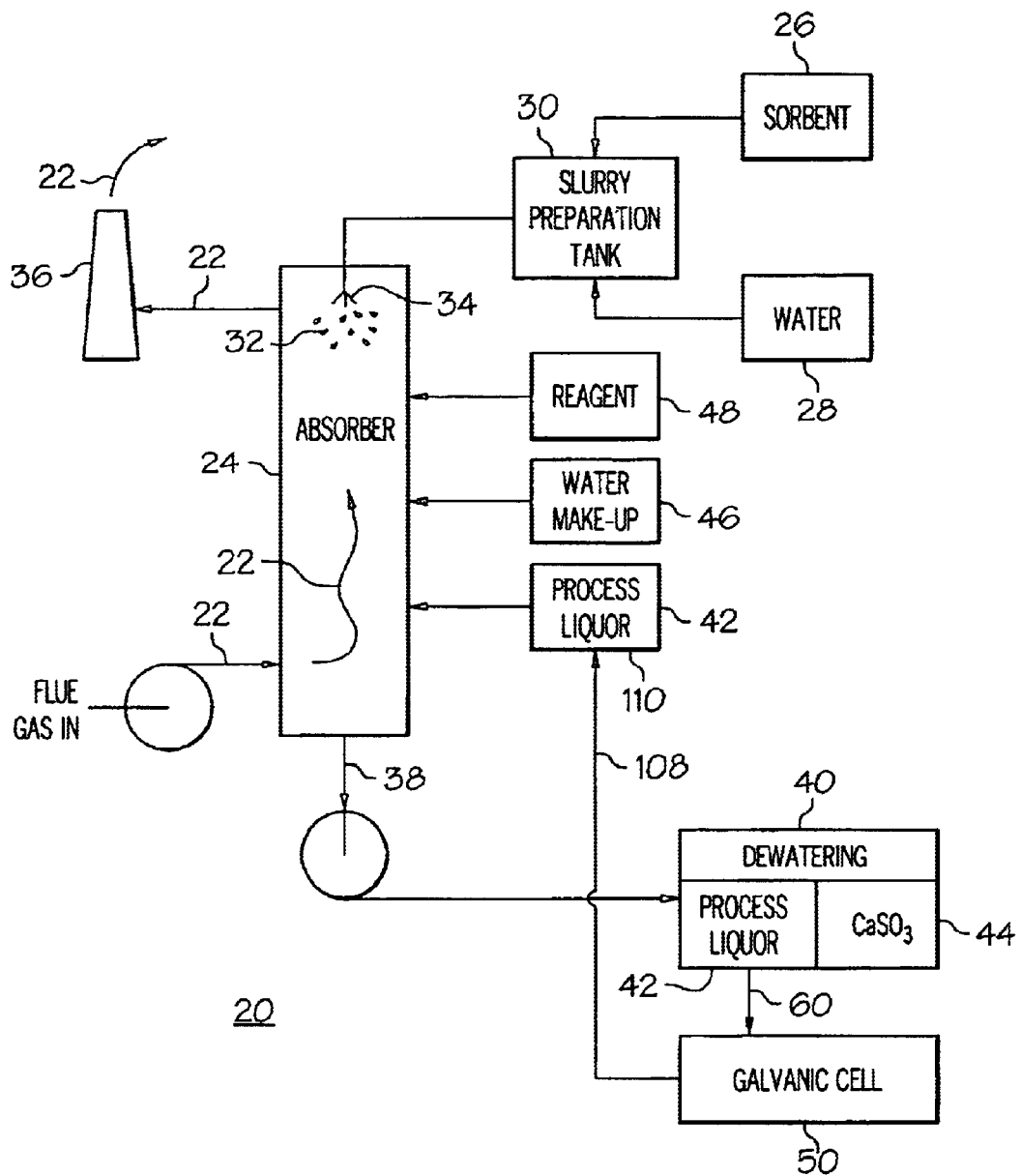
FIG. 1 shows a simplified block diagram of an inhibited oxidation scrubber for removing sulfur dioxide ($SO_2$) from flue gas.

FIG. 1 shows a simplified block diagram of an inhibited oxidation scrubber 20 for removing sulfur dioxide ($SO_2$) from flue gas 22. Inhibited oxidation is designed to limit the degree to which the sulfur dioxide that is absorbed by the system is oxidized once it has become soluble in the liquid phase.

As shown in FIG. 1, flue gas 22, which may be a combustion product of coal, fuel oil, or petroleum coke, produced by an electricity generating plant (not shown), is input into an absorber 24. A sorbent 26, such as limestone, high calcium lime, or a mixture of high calcium lime and dolomite, is mixed with water 28 in a slurry preparation tank 30 to form slurry 32. Slurry 32 from tank 30 is introduced into absorber 24 to allow pH control and to chemically tie up sulfur species in solution. Absorber 24 may be a counterflow tower with flue gas 22 flowing upwards, while slurry 32 is sprayed downwards by an array of spray nozzles 34. Sulfur dioxide is removed from flue gas 22 in absorber 24 by both sorption and reaction with slurry 32. Following sulfur dioxide removal, flue gas 22 is exhausted into the atmosphere from a chimney 36. Flue gas 22 exiting chimney 36 contains more water vapor than when flue gas 22 entered absorber 24. In addition, the exiting flue gas 22 has a substantially lower presence of sulfur dioxide.

Spent slurry, generally indicated by an arrow 38, exits absorber 24 and is pumped to a slurry dewatering system 40. Spent slurry 38 is a brine with a large presence of suspended solids formed during the desulfurization process of flue gas 22 in absorber 24. The suspended solids are in the form of calcium sulfite ($CaSO_3$), calcium sulfate ($CaSO_4$) and magnesium sulfite ($MgSO_3$). Dewatering system 40 separates water, known as process liquor 42, from spent slurry 38. The remaining solids 44, i.e., primarily calcium sulfite, are typically disposed of in a waste slurry pond (not shown). Alternatively, calcium sulfite solids 44 may be used in the production of Alpha plaster.

Clean water 46 and process liquor 42 are introduced into absorber 24 to offset the effects of evaporation and solids capture. Process liquor 42 aids in the scrubbing process by adding dissolved solids and nucleation sites to slurry 32 in absorber 24.

A reagent 48 is also used in absorber 24. In an inhibited oxidation process, reagent 48 is typically thiosulfate which serves to inhibit oxidation. Alternatively, elemental sulfur may be used in place of thiosulfate. When elemental sulfur contacts sulfite in inhibited oxidation scrubber 20, the sulfur is converted to thiosulfate.

In addition to inhibiting the oxidation of the absorbed sulfur dioxide, the thiosulfate reagent 48 allows the inhibited oxidation process of inhibited oxidation scrubber 20 to carry high levels of solution phase magnesium. Calcium sulfite and calcium sulfate solids 44 are profoundly insoluble, while magnesium sulfite is modestly soluble. Due to the greater solubility of magnesium salts compared to calcium sulfite and calcium sulfate solids 44, process liquor 42 of inhibited oxidation scrubber 20 can carry high levels of solution phase magnesium. Process liquor 42, carrying high levels of solution phase magnesium, is significantly more alkaline than a process liquor without these high levels of solution phase magnesium. As such, the presence of the magnesium salts in process liquor 42 can yield higher sulfur dioxide removal efficiencies than limestone based inhibited oxidation systems.

The presence of solution phase large metals, such as iron, are detrimental to thiosulfate reagent 48. Solution phase iron will force oxidation, using thiosulfate reagent 48 up more quickly than if the iron was not present. Thus, iron functions as an oxidation catalyst in inhibited oxidation scrubber 20 thereby undesirably countering the function of the inhibited oxidation process. Typically, this is counteracted by either adding more thiosulfate reagent 48, or by keeping the dissolved solids of the system lowered by blowing the system down, which throws process liquor 42 away.

The usefulness of adding more thiosulfate reagent 48 is hindered by process asymptotes that only allow certain thiosulfate levels, regardless of the input of thiosulfate reagent 48. These asymptotes are dictated by the levels of solution phase large metals, such as iron. Blowing down process liquor 42 creates water balance issues because clean water 46 replaces the blown down process liquor 42. The addition of clean water 46 dilutes the chemical balance of inhibited oxidation scrubber 20, creating non-optimum scrubbing conditions.

The interaction of alkalinity sources and water interacting in the sulfur removal inhibited oxidation process of scrubber 20 may be chemically characterized as follows:

$CaO + \frac{1}{2}H_2O = CaOH$ Slaking (of lime) process

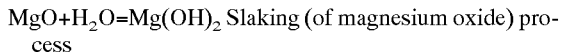
$MgO + H_2O = Mg(OH)_2$ Slaking (of magnesium oxide) process

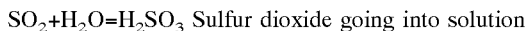
$SO_2 + H_2O = H_2SO_3$ Sulfur dioxide going into solution

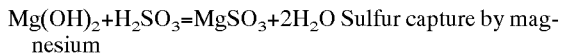
$Mg(OH)_2 + H_2SO_3 = MgSO_3 + 2H_2O$ Sulfur capture by magnesium

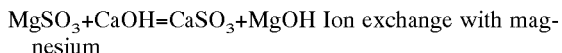
$MgSO_3 + CaOH = CaSO_3 + MgOH$ Ion exchange with magnesium

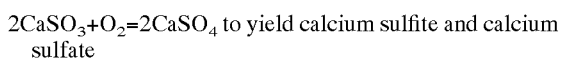
$2CaSO_3 + O_2 = 2CaSO_4$ to yield calcium sulfite and calcium sulfate Inhibited oxidation scrubber 20 further includes a galvanic cell system 50 in accordance with a preferred embodiment of the present invention. As discussed above, the presence of iron in process liquor 42 undesirably counteracts the function of the inhibited oxidation process. In addition, the presence of magnesium salts in process liquor 42 advantageously yields high sulfur dioxide removal efficiencies in inhibited oxidation scrubber 20. Galvanic cell system 50 is configured to receive process liquor 42 output from dewatering system 40 of scrubber 20 and remove the detrimental solution phase iron from process liquor 42. Galvanic cell system 50 is further configured to release beneficial magnesium into solution in process liquor 42. Following treatment by galvanic cell system 50, process liquor 42 is recycled into, or returned to, absorber 24 of inhibited oxidation scrubber 20.

Figure 2:
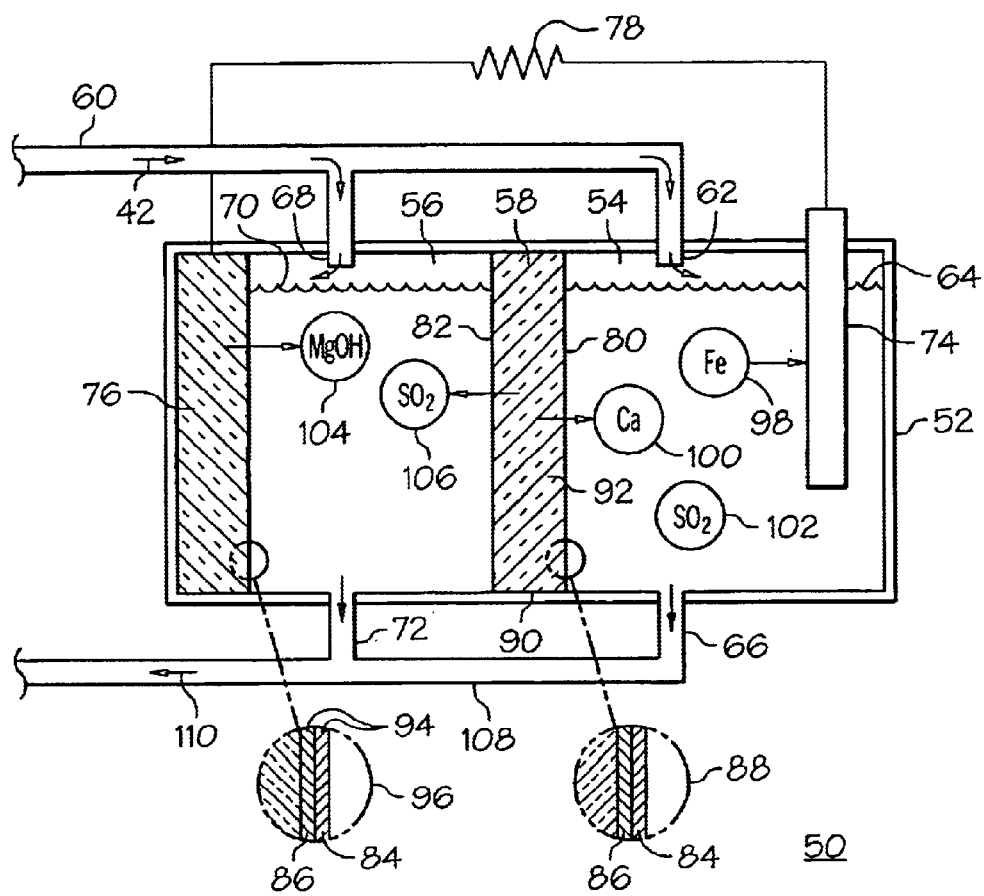
FIG. 2 shows a block diagram of a galvanic cell system for removing a solution phase metal from the process liquor produced by the inhibited oxidation scrubber in accordance with a preferred embodiment of the present invention.

FIG. 2 shows a block diagram of galvanic cell system 50 for removing a solution phase metal from process liquor 42 produced by inhibited oxidation scrubber 20 (FIG. 1). Galvanic cell system 50 is an electrochemical cell that converts chemical energy into electrical energy in response to an oxidation-reduction (redox) reaction occurring in the cell.

Galvanic cell system 50 is formed from an electrically nonconductive tank 52. For example, tank 52 may be a commercially available polyethylene containment tank configured to hold approximately eight hundred gallons of solution. Tank 52 is subdivided into a first half-cell 54, a second half-cell 56, and an ionic conductor section 58 interposed between first and second half-cells 54 and 56, respectively.

Process liquor 42 is delivered to galvanic cell system 50 via a conduit 60 (see also FIG. 1) interconnecting dewatering system 40 and galvanic cell system 50. First half-cell 54 has a first inlet 62 for receiving a first portion 64 of process liquor 42 from conduit 58 and a first outlet 66. Likewise, second half-cell 56 has a second inlet 68 for receiving a second portion 70 of process liquor 42 from conduit 60 and a second outlet 72.

A cathode 74 is positioned in first half-cell 54, at which a reduction reaction occurs with first portion 64 of process liquor 42. Likewise, an anode 76 is positioned in second half-cell 56, at which an oxidation reaction occurs with second portion 70 of process liquor 42. An electrical load circuit 78 is coupled between cathode 74 and anode 76. Electrical load circuit 78 represents the circuitry that utilizes the electricity generated in the redox reaction of galvanic cell system 50. The electricity may be used for exportation, to operate the electricity generating plant, or to generate heat.

Ionic conductor section 58 is a bridge circuit having a first ion permeable membrane 80 in communication with first half-cell 54 and a second ion permeable membrane 82 in communication with second-half cell 56. First and second ion permeable membranes 80 and 82, respectively, are constructed out of a fiberglass grating 84 with a Poly Tetra FluoroEthylene (PTFE) membrane overlay 86, as exemplified in a detail view 88. A center section 90 is bordered by first and second permeable membranes 80 and 82, respectively. Center section 90 contains an ionic conductor 92. First and second ion permeable membranes 80 and 82, respectively, allow the passage of ions from center section 90 to each of first and second half-cells 54 and 56, but are substantially impermeable to a liquid phase of first portion 64 and second portion 70 of process liquor 42.

In a preferred embodiment, cathode 74 is an iron electrode formed from carbon steel plates. Anode 76 contains magnesium. For example, anode 76 may be a magnesium hydroxide paste electrode. When anode 76 is a magnesium hydroxide paste electrode, second half-cell includes a third ion permeable membrane 94 separating anode 76 from second portion 70 of process liquor 42. Like first and second ion permeable membranes 80 and 82, respectively, third ion permeable membrane 94 is constructed out of a fiberglass grating 84 with a PTFE membrane overlay 86, as exemplified in a detail view 96. The redox reaction of galvanic cell system 50, discussed below, the magnesium hydroxide from anode 76 to be released into solution in second portion 70 of process liquor 42. As such, anode 76 of galvanic cell system 50 is a sacrificial electrode. In a preferred embodiment, anode 76 has an electronegativity greater than the solution phase metal to be removed from first portion 64 of process liquor 42. For example, when anode 76 is a magnesium-based sacrificial electrode, vanadium, chromium, copper, and lead can also be removed from solution.

Ionic conductor 92 is a metal or semi-metal, tied to an acid gas or chalcogen. Examples of the acid gases include fluorides, chloride, sulfites, or sulfates. Examples of chalcogenides, or compounds made up of a chalcogen include oxides, sulfide, selenides, or polonides. The metal or semi-metal has an electronegativity higher than the sacrificial electrode, i.e. anode 76. For example, when anode 76 is a magnesium-based sacrificial electrode, the metal or semi-metal of ionic conductor 92 may be calcium, potassium, vanadium, strontium, or sodium.

In a preferred embodiment, ionic conductor 92 is calcium sulfite ($CaSO_3$) solids 44 (FIG. 1) separated from process liquor 42 by dewatering system 40 (FIG. 1). Thus, galvanic cell system 50 effectively utilizes a waste product formed by the inhibited oxidation process of system 20 (FIG. 1). Calcium sulfite solids 44 provide a highly economical alternative to other ionic conductors due to their ready availability.

Once galvanic cell system 50 is established and first portion 64 of process liquor 42 is received at first half-cell 54 and second portion 70 of process liquor 42 is received at second half-cell 56, a spontaneous redox reaction is produced in galvanic cell system 50. A reduction reaction in first half-cell 54 causes a detrimental oxidation catalyzing solution phase metal, i.e. iron (Fe), 98 to be removed from first portion 54 of process liquor 42 in first half-cell 54. More particularly, calcium (Ca) 100 is released from ionic conductor section 58 into first portion 54 of process liquor 42. In addition, sulfur dioxide ($SO_2$) 102, associated with iron 98 in first portion 54, is released from iron 98. Calcium 100 ties with sulfur dioxide 102 and iron 98 plates onto cathode 74.

A simultaneous oxidation reaction in second half-cell 56 causes a beneficial metal, magnesium to be released into solution. More particularly, magnesium hydroxide (MgOH) 104 is released from anode 76 into second portion 56 of process liquor 42. Sulfur dioxide ($SO_2$) 106 is released from ionic conductor section 58 into second portion 56 of process liquor 42 and ties with magnesium hydroxide 104.

Following the redox reaction in galvanic cell system 50, first portion 64 of process liquor 42, absent iron 98, is released from first outlet 66 (FIG. 2) of first half-cell 54. Likewise, second portion 70 of process liquor 42, enhanced with magnesium, is released from second outlet 72. First and second portions 64 and 70, respectively, of process liquor 42 are recombined in a combiner element, for example, a common conduit 108, as combined process liquor 110. Combined process liquor 110 output from first and second half-cells 54 and 56, respectively, is subsequently returned to inhibited oxidation scrubber 20 via conduit 108 (see also FIG. 1).

Figure 3:
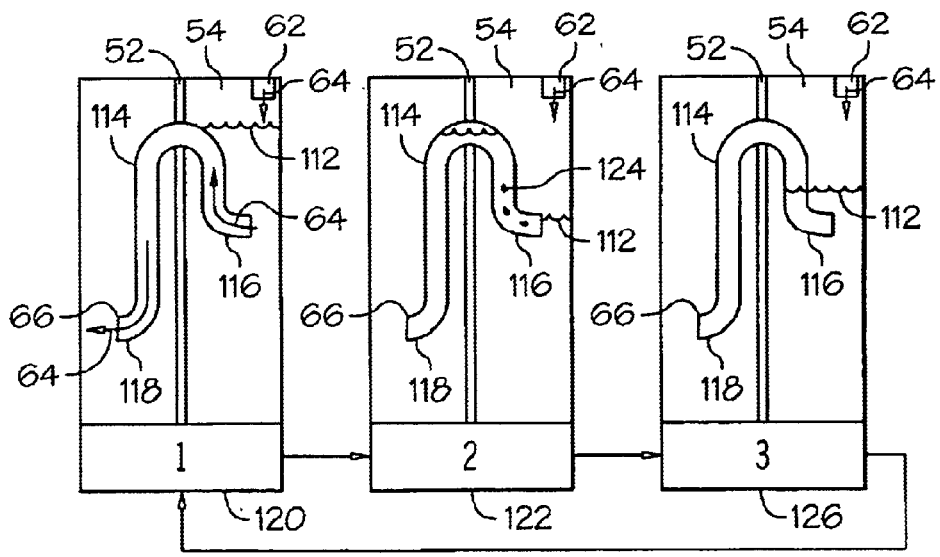
FIG. 3 shows a flow diagram of a fluid level in the galvanic cell being maintained by a passive fluid level control element.

FIG. 3 shows a flow diagram of a fluid level 112 in galvanic cell system 50 being maintained by a passive fluid level control element 114 as combined process liquor 110 (FIG. 2) is returned to scrubber 20 (FIG. 1). A continuous flow of process liquor 42 into and out of galvanic cell system 50 (FIG. 2) is desirable to mitigate problems associated with electrode polarization. Element 114 effectively controls a passive discharge of process liquor 42 from galvanic cell system 50 in response to fluid level 112 in first and second half-cells 54 and 56 without the need for more costly and less reliable electrically-actuated valve systems.

Each of first and second half-cells 54 and 56, respectively, includes passive fluid level control element 114. However, passive fluid level control element 114 is described in connection with first half-cell 54 and first portion 64 of process liquor 42 for clarity of illustration. As such, it should be understood that the following description applies to level control of process liquor in second half-cell 56 as well.

Passive fluid level control element 114 is a generally u-shaped siphon line. Element 114 breaches tank 52 so that a first end 116 of element 114 is inside of first half-cell 54 and a second end 118 of element 114 is outside of tank 52. Second end 118 forms first outlet 66, which is in fluid communication with common conduit 118 (FIG. 2). First portion 64 of process liquor 42 enters first half-cell 54 via first inlet 62 in a continuous flow.

As shown in a first scene 120, when fluid level 112 reaches the top of element 114, a siphon is established. The siphon pulls first portion 64 of process liquor 42 from first end 116 of siphon element 114 to second end 118 to passively discharge first portion 64 from first outlet 66 of first half-cell 54.

As a result of the siphoning action of element 114 and the flow rate from first inlet 62, fluid level 112 decreases. As shown in a second scene 122, when fluid level 112 decreases below first end 116, air 124 enters first end 116 of element 114 and the siphon action is broken. Once the siphon action is broken, first portion 64 is no longer released from first outlet 66.

As shown in a third scene 126, with the siphon action broken, fluid level 112 will again begin to increase. Accordingly, when fluid level 112 reaches the top of element 114, a siphon is once again established and a passive discharge of first portion 64 is enabled, as represented by the loop back to first scene 120.

Referring back to FIG. 2, combined process liquor 110 has a significantly lower level of the detrimental solution phase iron 98 and a significantly higher level of the beneficial magnesium 104. Thus, combined process liquor 110 advantageously decreases the oxidation potential in inhibited oxidation scrubber 20 and increases the scrubbing efficiency of scrubber 20. In particular, inhibited oxidation scrubber 20 can utilize combined process liquor 110 having higher total dissolved solids levels than conventional scrubbers currently operate because the detrimental oxidation catalyst, i.e., iron 98, has been replaced by a beneficial metal, i.e. magnesium 104. Greater scrubbing efficiency translates into lower costs associated with the decreased quantities of sorbent 26 (FIG. 1) and fresh water that are needed to replace blown down process liquor. In addition, by removing iron 98, less thiosulfate reagent 48 (FIG. 1) is required by inhibited oxidation scrubber 20, further lowering operating costs.

Yet another advantage of the use of galvanic cell system 50 is the resulting generation of electricity during the operation of galvanic cell system 50. This electricity can be utilized to operate the electricity generating plant, to generate heat, or the electricity can be exported as a salable product. Thus, the inclusion of galvanic cell system 50 decreases costs associated with energy utilization to operate the inhibited oxidation scrubber 20.

Forced Oxidation Process

Figure 4:
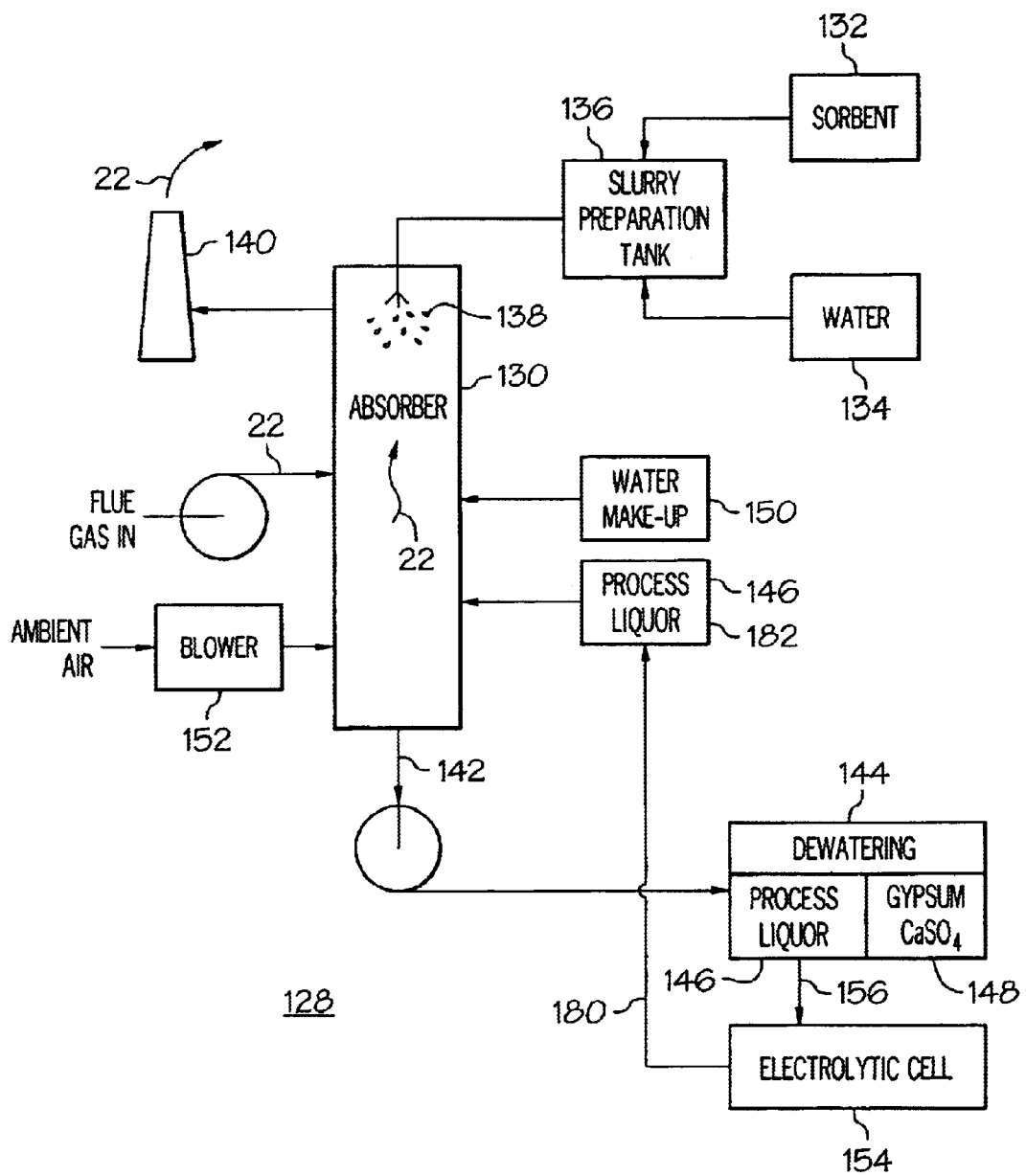
FIG. 4 shows a simplified block diagram of a forced oxidation scrubber for removing sulfur dioxide from flue gas.

FIG. 4 shows a simplified block diagram of an forced oxidation scrubber 128 for removing sulfur dioxide ($SO_2$) from flue gas 22. Forced oxidation is designed to increase the degree to which the sulfur dioxide that is absorbed by the system is oxidized once it has become soluble in the liquid phase.

As shown in FIG. 4, flue gas 22 is input into an absorber 130. A sorbent 132, such as high calcium lime or limestone, is mixed with water 134 in a slurry preparation tank 136 to form slurry 138. Slurry 138 from tank 136 is introduced into absorber 130 to allow pH control and to chemically tie up sulfur species in solution. Following sulfur dioxide removal, flue gas 22, having a substantially lower presence of sulfur dioxide, is exhausted into the atmosphere from a chimney 140.

Spent slurry, generally indicated by an arrow 142, exits absorber 130 and is pumped to a slurry dewatering system 144. Spent slurry 142 is a brine with a large presence of suspended solids formed during the desulfurization process of flue gas 22 in absorber 130. The suspended solids are in the form of calcium sulfate ($CaSO_4$) and fly ash. Dewatering system 144 separates water, or process liquor 146, from spent slurry 142. The remaining solids 148, primarily calcium sulfate, or gypsum, is a salable product that may be used for plaster, wall board, some cements, fertilizer, paint filler, ornamental stone, and so forth. Clean water 150 and process liquor 146 are introduced into absorber 130 to offset the effects of evaporation and solids capture. Process liquor 146 aids in the scrubbing process by adding dissolved solids and nucleation sites to slurry 138 in absorber 130.

A blower 152 is used to blow air into absorber 130 to encourage, or force, oxidation. Forced oxidation scrubber 128 is aided in the forced oxidation process by the presence of solution phase oxidation catalytic metals, such as iron. However, the forced oxidation process is hindered, or inhibited, by other solution phase metals, such as aluminum.

Thus, aluminum functions as an oxidation inhibitor in forced oxidation scrubber 128 thereby undesirably countering the function of the forced oxidation process. Typically, this is counteracted by adding more air via blower 152, by adding solution phase iron to process liquor 146, or by limiting the aluminum presence by blowing down the system, i.e., removing process liquor 146 from the system. Of course, these solutions are costly in terms of the energy required to operate blower 152, the addition of solution phase iron, or the additional clean water 150 required to replace the blown down process liquor 146. Moreover, like inhibited oxidation system 20 (FIG. 1), blowing down process liquor 146 creates water balance issues because clean water 150 dilutes the chemical balance of forced oxidation scrubber 128, creating non-optimum scrubbing conditions.

The interaction of alkalinity sources and water interacting in the sulfur removal forced oxidation process of scrubber 128 may be chemically characterized as follows:

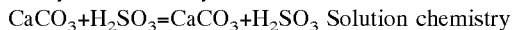
$CaCO_3+H_2SO_3=CaCO_3+H_2SO_3$ Solution chemistry
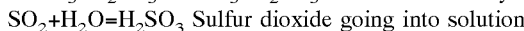
$SO_2+H_2O=H_2SO_3$ Sulfur dioxide going into solution
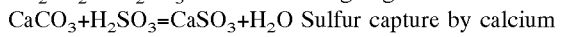
$CaCO_3+H_2SO_3=CaSO_3+H_2O$ Sulfur capture by calcium Forced oxidation scrubber 128 further includes an electrolytic cell system 154 in accordance with an alternative embodiment of the present invention. As discussed above, the presence of solution phase aluminum in process liquor 146 undesirably inhibits the function of the forced oxidation process. Thus, the solution phase aluminum is an oxidation inhibitor. In addition, the presence of iron in process liquor 146 advantageously yields high sulfur dioxide removal efficiencies in forced oxidation scrubber 128. Electrolytic cell system 154 is configured to receive process liquor 146 output from dewatering system 144 of scrubber 128 and remove the oxidation inhibiting solution phase aluminum from process liquor 146. Electrolytic cell system 154 is further configured to release beneficial iron into solution in process liquor 146. Following treatment by electrolytic cell system 128, process liquor 146 is recycled into absorber 130 of forced oxidation scrubber 128.

Figure 5:
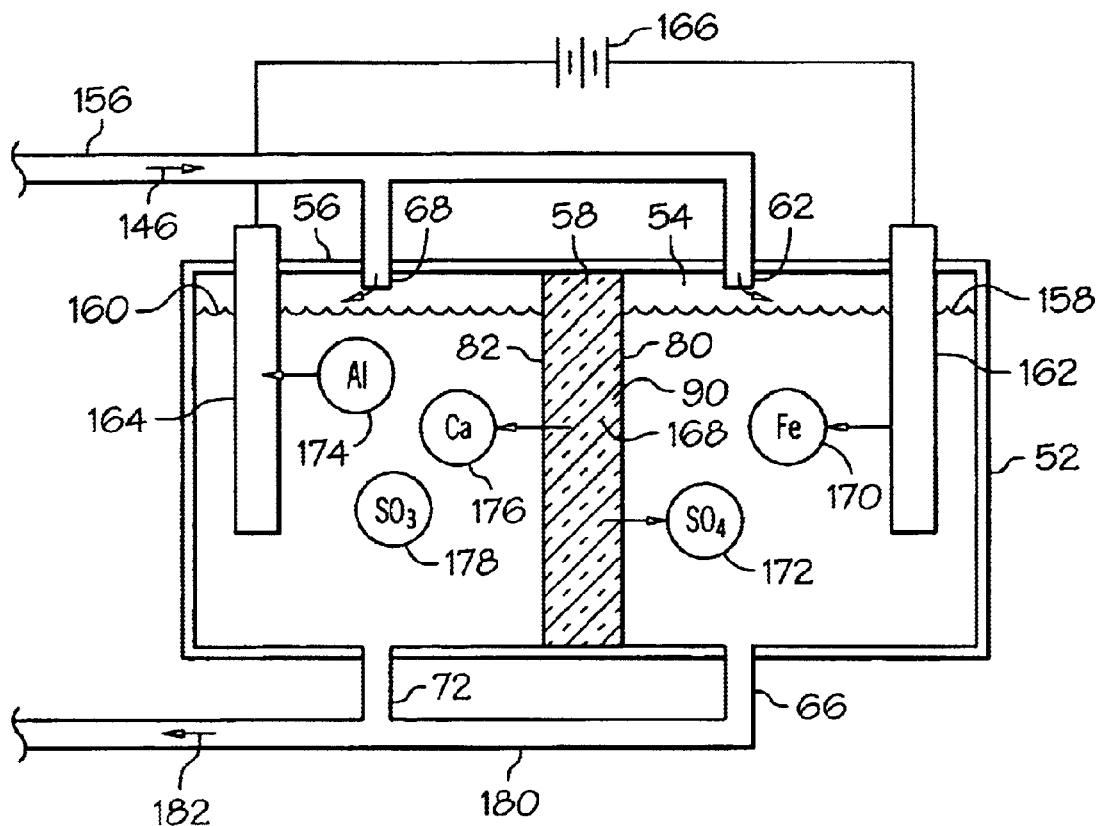
FIG. 5 shows a block diagram of an electrolytic cell system for removing a solution phase metal from the process liquor produced by the forced oxidation scrubber in accordance with an alternative embodiment of the present invention.

FIG. 5 shows a block diagram of electrolytic cell system 154 for removing a solution phase metal from process liquor 146 produced by forced oxidation scrubber 128 (FIG. 4). Electrolytic cell system 154 is an electrochemical cell that converts electrical energy into chemical energy in response to an oxidation-reduction (redox) reaction occurring in the cell.

Electrolytic cell system 154 is manufactured similarly to galvanic cell system 50 (FIG. 2). Accordingly, like reference numbers between galvanic cell system 50 and electrolytic cell system 154 refer to similar items. As such, electrolytic cell system 154 is formed from tank 52 which is subdivided into first half-cell 54, second half-cell 56, and ionic conductor section 58 interposed between first and second half-cells 54 and 56, respectively.

Process liquor 146 is delivered to electrolytic cell system 128 via a conduit 156 (see also FIG. 4) interconnecting dewatering system 144 and electrolytic cell system 154. First inlet 62 of first half-cell 54 is configured to receive a first portion 158 of process liquor 146 from conduit 156. Likewise, second inlet 68 of second half-cell 56 is configured to receive a second portion 160 of process liquor 146 from conduit 156. Electrolytic cell system 154 further includes passive fluid level control elements 114 (FIG. 3) at each of first and second outlets 66 and 72, respectively, for enabling a passive discharge of first and second portions 158 and 160, respectively, of process liquor 146, as described previously.

A cathode 162 is positioned in first half-cell 54, at which a reduction reaction occurs with first portion 158 of process liquor 146. Likewise, an anode 164 is positioned in second half-cell 56, at which an oxidation reaction occurs with second portion 160 of process liquor 146. A power supply circuit 166 is coupled between cathode 162 and anode 164. Power supply circuit 166 represents the circuitry employed to apply an external current in order to force a non-spontaneous redox reaction in electrolytic cell system 154.

Like galvanic cell system 50 (FIG. 2), ionic conductor section 58 includes first ion permeable membrane 80 in communication with first half-cell 54 and second ion permeable membrane 82 in communication with second-half cell 56. Center section 90 is bordered by first and second permeable membranes 80 and 82, respectively, as previously described. Center section 90 contains an ionic conductor 168.

Cathode 162 includes a metal having an electronegativity less than an electronegativity of ionic conductor 168 and greater than an electronegativity of anode 164. For example, cathode 162 is an iron electrode formed from carbon steel plates and anode 164 is an aluminum-based electrode. When current from power supply circuit 166 is applied to electrolytic cell system 154, the resulting redox reaction causes iron from iron cathode 162 to be released into solution in first portion 158 of process liquor 146, and the aluminum in second portion 160 of process liquor 146 to by removed from second portion 160 by plating to aluminum anode 164. As such, cathode 162 of electrolytic cell system 154 is the sacrificial electrode.

In a preferred embodiment, ionic conductor 168 is calcium sulfate ($CaSO_4$) solids 148 (FIG. 4) separated from process liquor 146 by dewatering system 144 (FIG. 4) and having an electronegativity higher than the sacrificial electrode, i.e., cathode 162. Thus, electrolytic cell system 154 effectively utilizes the product, i.e., gypsum, formed by the forced oxidation process of system 128 (FIG. 4). Calcium sulfate solids 148 provide a highly economical alternative to other ionic conductors due to their ready availability.

Once electrolytic cell system 154 is established by applying current from power supply circuit 166, and first portion 158 of process liquor 146 is received at first half-cell 54 and second portion 160 of process liquor 146 is received at second half-cell 56, a redox reaction is produced in electrolytic cell system 154. A reduction reaction in first half-cell 54 causes a beneficial metal, i.e. iron (Fe), 170 to be released from iron cathode 162. More particularly, iron 170 goes into solution, sulfate ($SO_4$) 172 is released from ionic conductor section 58 into first portion 158 of process liquor 42, and sulfate 172 ties up with the solution phase iron 170.

A simultaneous oxidation reaction in second half-cell 56 causes an oxidation inhibiting solution phase metal, i.e. aluminum (Al), 174 to be removed from second portion 160 of process liquor 146 in second half-cell 56. More particularly, calcium (Ca) 176 is released from ionic conductor section 58 into second portion 160 of process 146. In addition, sulfite ($SO_3$) 178, associated with aluminum 174 on anode 164, is released from aluminum 174. Calcium 176 ties with sulfite 178 and aluminum 174 plates onto anode 164.

Following the redox reaction in electrolytic cell system 154, first portion 158 of process liquor 146, enhanced with iron 170, is released from first outlet 66 of first half-cell 54. Likewise, second portion 160 of process liquor 146, absent aluminum 174, is released from second outlet 72. First and second portions 158 and 160, respectively, of process liquor 146 are recombined in a common conduit 180 as combined process liquor 182. Combined process liquor 182, output from first and second half-cells 54 and 56, respectively, is subsequently returned to forced oxidation scrubber 128 via conduit 180 (see also FIG. 4).

Combined process liquor 182 has a significantly lower level of the detrimental solution phase aluminum 174 and a significantly higher level of the beneficial solution phase iron 170. Thus, combined process liquor 182 advantageously increases the oxidation potential in forced oxidation scrubber 128 (FIG. 4) and increases the scrubbing efficiency of scrubber 128. In particular, forced oxidation scrubber 128 can utilize combined process liquor 182 having higher total dissolved solids levels than conventional scrubbers currently operate because the detrimental oxidation inhibitor, i.e., aluminum 174, has been replaced by a beneficial metal, i.e. iron 170. Greater scrubbing efficiency translates into lower costs associated with the decreased quantities of sorbent 132 (FIG. 4) and fresh water that are needed to replace blown down process liquor.

In addition, by removing aluminum 174 from process liquor 146, the operation of blower 152 can be eliminated or greatly reduced. Since, blowers in a forced oxidation scrubber typically consume several megawatts of power, a reduction of their use results in a higher net volume of electricity generated by an electricity generating plant.

Figure 6:
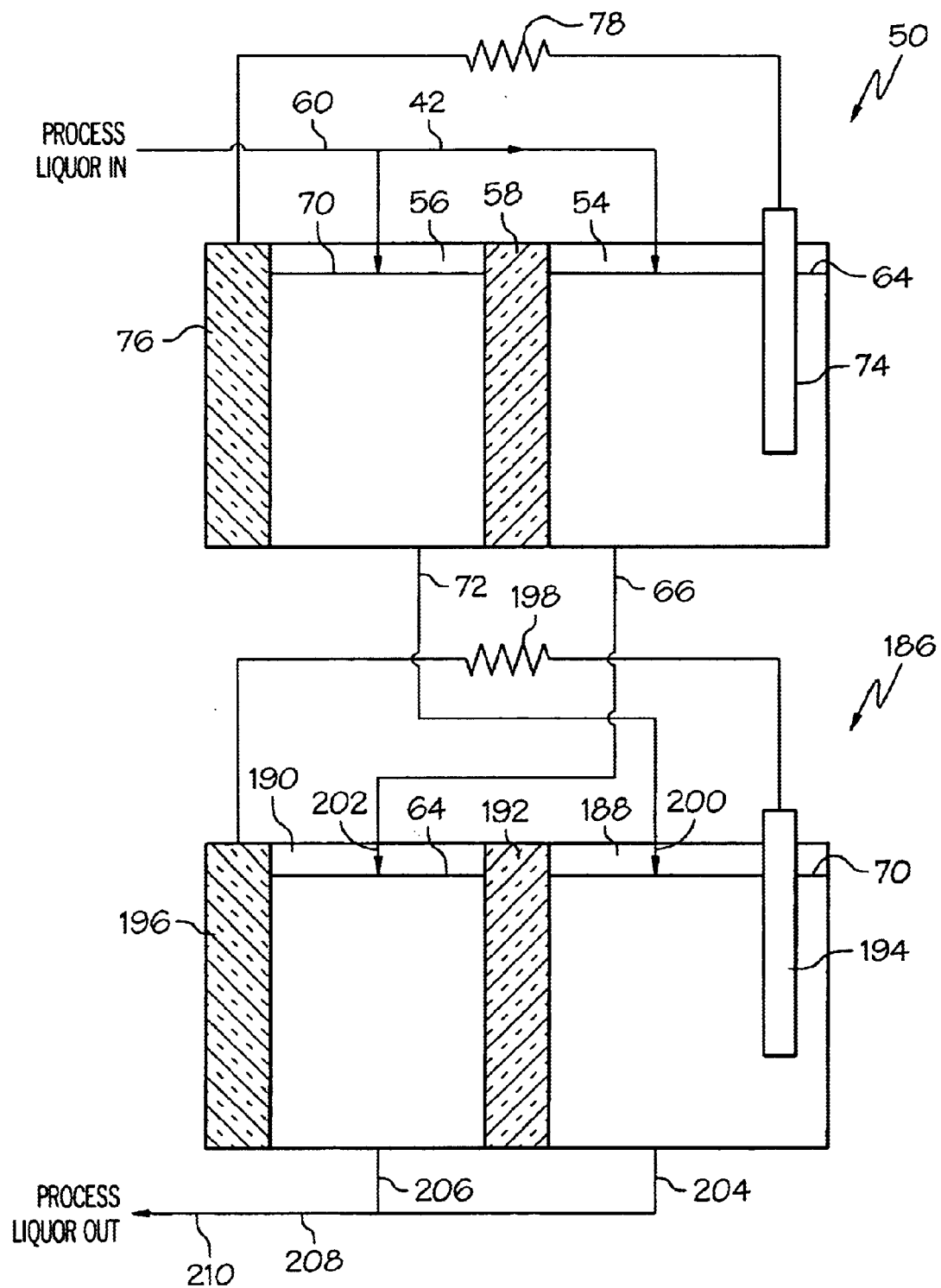
FIG. 6 shows a dual electrochemical cell system in accordance with another alternative embodiment of the present invention.

FIG. 6 shows a dual electrochemical cell system 184 in accordance with another alternative embodiment of the present invention. The configurations of galvanic cell system 50 (FIG. 2) and electrolytic cell system 154 (FIG. 5) result in the detrimental solution phase metal being removed from the process liquor in only one of the half-cells. Likewise, the configurations of systems 50 and 154 result in the release of a beneficial metal into the process liquor in the other of the half-cells. When the level of detrimental solution phase metal is very high in the process liquor, it may be desirable to remove the detrimental solution phase metal from all of the process liquor, i.e. both of the half-cells. Dual electrochemical cell system 184 performs this function.

For simplicity, system 184 is a galvanic cell system for removing iron from process liquor of an inhibited oxidation scrubber. However, the principles of the following discussion may be applied to an electrolytic cell system for removing aluminum from process liquor of a forced oxidation scrubber.

Dual system 184 includes galvanic cell system 50. As described in detail previously, as a consequence of the spontaneous redox reaction in system 50, first portion 64 of process liquor 42 is released from first outlet 66 absent iron, and second portion 70 of process liquor 72 is released from second outlet 72 enhanced with magnesium.

Dual system 184 further includes a second galvanic cell system 186. Second galvanic cell system 186 is configured similarly to galvanic cell system 50. Thus, second galvanic cell system 186 includes a third half-cell 188, a fourth half-cell 190, and a second ionic conductor section 192 interposed therebetween. Ionic conductor section 192 desirably contains calcium sulfite ($CaSO_3$) solids 44 (FIG. 1) separated from process liquor 42 by a dewatering system, such as dewatering system 40 (FIG. 1).

In addition, second galvanic cell system 186 includes a second iron cathode 194, a second magnesium hydroxide paste anode 196, and a second electrical load circuit 198 coupled between second cathode 194 and second anode 196. The operation of second galvanic cell system 186 is similar to galvanic cell system 50. Accordingly, the teachings of galvanic cell system 50 apply to system 186 as well.

Second outlet 72 of galvanic cell system 50 is coupled to a third inlet 200 of third half-cell 188. Thus, third half-cell 188 is configured to receive second portion 70 of process liquor 42, second portion 70 containing iron and magnesium. Likewise, first outlet 66 is coupled to a fourth inlet 202 of fourth half-cell 190. Thus, fourth half-cell 190 is configured to receive first portion 64 of process liquor 42, first portion 64 being absent iron and magnesium.

A spontaneous redox reaction in second galvanic cell system 186 causes the iron to be removed from second portion 70 of process liquor 42 in third half-cell 188 by plating onto second iron cathode 194. In addition, the redox reaction of system 186 causes the magnesium from second magnesium hydroxide paste electrode to be released into first portion 64 of process liquor 42 in fourth half-cell 190.

Following the redox reaction of second galvanic cell system 186, second portion 70 of process liquor 42, absent iron, exits third-half cell 188 via a third outlet 204 and first portion 64 of process liquor 42, enhanced with magnesium, exits fourth half-cell 190 via a fourth outlet 206. First and second portions 64 and 70, respectively, of process liquor 42 are combined in a common conduit 208 to form combined process liquor 210 with a completely absent or significantly decreased iron presence and enhanced with magnesium.

Thus, the inclusion of dual electrochemical cell system 184 to remove high levels of detrimental solution phase metal from the process liquor of a scrubber, causes the scrubbing efficiency of the scrubber to be improved over conventional system. In the case of an inhibited oxidation scrubber, greater scrubbing efficiency translates into lower costs associated with the decreased quantities of sorbent, thiosulfate reagent, and fresh water that are needed to replace that lost in the blown down process liquor. Moreover, revenue generating electricity is produced by each of galvanic cell system 50 and second galvanic cell system 184. In the case of a forced oxidation scrubber, greater scrubbing efficiency translates into lower costs associated with the decreased quantities of sorbent and fresh water that are needed to replace that lost in the blown down process liquor. Furthermore, by removing high levels of aluminum from process liquor, the operation of blower can be eliminated or greatly reduced, yielding a higher net volume of electricity generated by an electricity generating plant.

In summary, the present invention teaches of a system and method for removing a solution phase metal from process liquor produced by a flue gas desulfurization (FLD) scrubber. The solution phase metal is removed from the process liquor in response to an oxidation-reduction reaction occurring in an electrochemical cell. The redox reaction causes the detrimental solution phase metal to plate onto one of the electrodes in the electrochemical cell. The other of the electrodes serves as a sacrificial electrode for releasing a beneficial metal into solution in the process liquor. Through the appropriate selection of the electrodes and the ionic conductor, the present-invention can selectively remove a solution phase metal from the process liquor produced by either of an inhibited oxidation and an forced oxidation scrubber. The electrochemical cell system achieves savings by reducing the amount of process liquor that is blown down in an FGD scrubber, thus reducing the amount of sorbent, reagents, and water needed to replace the blown down process liquor. Moreover, the use of a galvanic cell system with an inhibited oxidation scrubber produces salable electricity, while the use of an electrolytic cell system with a forced oxidation scrubber decreases the reliance on high energy using blowers to force oxidation in the scrubber. Furthermore, the present invention may be cost effectively implemented within an existing wet FGD scrubber.

Although the preferred embodiments of the invention have been illustrated and described in detail, it will be readily apparent to those skilled in the art that various modifications may be made therein without departing from the spirit of the invention or from the scope of the appended claims. For example, if more capacity is desired, other electrochemical cells may be added and electrically installed in parallel.

What is claimed is:

1. An electrochemical cell system for removing a solution phase metal from process liquor comprising:
   a first half-cell having a first inlet configured to receive a first portion of said process liquor, and having a first outlet;
   a cathode in said first half-cell at which a reduction reaction occurs with said first portion of said process liquor, said first portion of said process liquor being released from said first outlet following said reduction reaction;
   a second half-cell having a second inlet configured to receive a second portion of said process liquor, and having a second outlet;
   an anode in said second half-cell at which an oxidation reaction occurs with said second portion of said process liquor, said second portion of said process liquor being released from said second outlet following said oxidation reaction;
   an electrical circuit coupled between said cathode and said anode; and
   an ionic conductor section containing an ionic conductor for enabling a transfer of ions from said ionic conductor into each of said first and second half-cells, wherein said reduction and oxidation reactions form a redox reaction causing said solution phase metal to be removed from one of said first and second portions of said process liquor.

2. An electrochemical cell system as claimed in claim 1 further comprising a passive fluid level control element forming each of said first and second outlets for enabling a passive discharge of said first and second portions of said process liquor in response to a fluid level in said first and second half-cells.

3. An electrochemical cell system as claimed in claim 1 wherein said process liquid is output from an inhibited oxidation scrubber, said electrochemical cell system is a galvanic cell, and said electrical circuit is a load circuit.

4. An electrochemical cell system as claimed in claim 1 wherein said solution phase metal is an oxidation catalyst, said anode comprises a metal having an electronegativity less than an electronegativity of said ionic conductor and greater than an electronegativity of said oxidation catalyst, and said redox reaction causes said oxidation catalyst in said first portion of said process liquor to plate to said cathode.

5. An electrochemical cell system as claimed in claim 4 wherein said oxidation catalyst is iron, and said cathode is an iron electrode.

6. An electrochemical cell system as claimed in claim 4 wherein said anode includes magnesium, and said redox reaction further causes said magnesium from said anode to be released into solution in said second portion of said process liquor.

7. An electrochemical cell system as claimed in claim 1 wherein:
   said anode is a magnesium hydroxide paste; and
   said second half-cell includes an ion permeable membrane separating said magnesium hydroxide paste from said second portion of said process liquor.

8. An electrochemical cell system as claimed in claim 1 wherein said process liquor is output from a forced oxidation scrubber, said electrochemical cell system is an electrolytic cell, and said electrical circuit is a power supply circuit.

9. An electrochemical cell system as claimed in claim 1 wherein said solution phase metal is an oxidation inhibitor, said cathode comprises a metal having an electronegativity less than an electronegativity of said ionic conductor and greater than an electronegativity of said anode, and said redox reaction causes said oxidation inhibitor in said second portion of said process liquor to plate to said anode.

10. An electrochemical cell system as claimed in claim 9 wherein said oxidation inhibitor is aluminum, and said anode is an aluminum electrode.

11. An electrochemical cell system as claimed in claim 9 wherein said cathode is an iron electrode, and said redox reaction further causes iron from said cathode to be released into solution in said first portion of said process liquor.

12. An electrochemical cell as claimed in claim 1 wherein said solution phase metal in said process liquor is removed by plating onto one of said anode and said cathode, the other of said anode and said cathode is a sacrificial electrode, and said ionic conductor includes a metal having an electronegativity higher than an electronegativity of said sacrificial electrode.

13. An electrochemical cell as claimed in claim 1 wherein said ionic conductor is calcium sulfite.

14. An electrochemical cell as claimed in claim 1 wherein said ionic conductor is calcium sulfate.

15. An electrochemical cell as claimed in claim 1 wherein said ionic conductor section comprises:
   a first ion permeable membrane in communication with said first half-cell;
   a second ion permeable membrane in communication with said second half-cell; and
   a center section bordered by said first and second ion permeable membranes, said center section containing said ionic conductor.

16. An electrochemical cell as claimed in claim 15 wherein each of said first and second ion permeable membranes are substantially impermeable to a liquid phase of said first and second portions of said process liquor.

17. An electrochemical cell system as claimed in claim 1 wherein said process liquid is output from a scrubber and said system further comprises a combiner, in fluid communication with each said first and second outlets, for combining said first and second portions of said process liquor and returning said combined process liquor to said scrubber.

18. An electrochemical cell system as claimed in claim 1 further comprising:
a third half-cell having a third inlet configured to receive said second portion of said process liquor, and having a third outlet;
a second cathode in said third half-cell at which a second reduction reaction occurs with said second portion of said process liquor, said second portion of said process liquor being released from said third outlet following said second reduction reaction;
a fourth half-cell having a fourth inlet configured to receive said first portion of said process liquor, and having a fourth outlet;
an second anode in said fourth half-cell at which a second oxidation reaction occurs with said first portion of said process liquor, said first portion of said process liquor being released from said fourth outlet following said second oxidation reaction;
a second electrical circuit coupled between said second cathode and said second anode; and
a second ionic conductor section containing a second ionic conductor for enabling a transfer of ions from said second ionic conductor into each of said third and fourth half-cells, wherein said second reduction and second oxidation reactions form a second redox reaction causing said solution phase metal to be removed from the other of said first and second portions of said process liquor.

19. A method for removing a solution phase metal from process liquor output from a scrubber comprising:
establishing an electrochemical cell having a first half-cell, a second half-cell, and an ionic conductor section containing an ionic conductor for enabling a transfer of ions from said ionic conductor into each of said first and second half-cells, said first half-cell having a cathode located therein, said second half-cell having an anode located therein, said anode including a metal having an electronegativity less than an electronegativity of said ionic conductor;
receiving a first portion of said process liquor at said first half-cell;
receiving a second portion of said process liquor at said second half-cell;
producing a redox reaction in said electrochemical cell system, said redox reaction causing said solution phase metal to be removed from one of said first and second portions of said process liquor;
following said redox reaction, combining said first and second portions of said process liquor; and
returning said combined process liquor to said scrubber.

20. A method as claimed in claim 19 wherein said scrubber is an inhibited oxidation scrubber, said solution phase metal is an oxidation catalyst, and said method further comprises plating said oxidation catalyst onto said cathode in response to said redox reaction to remove said oxidation catalyst from said first portion of said process liquor.

21. A method as claimed in claim 19 wherein said scrubber is an inhibited oxidation scrubber, and said method further comprises:
generating electricity in response to said redox reaction; and
providing said electricity to a load circuit coupled between said anode and said cathode.

22. A method as claimed in claim 19 wherein said scrubber is a forced oxidation scrubber, said solution phase metal is an oxidation inhibitor, and said producing operation comprises:
imparting electricity on said electrochemical cell from a power supply circuit coupled between said anode and said cathode; and
plating, in response to said imparting operation, said oxidation inhibitor onto said anode to remove said oxidation inhibitor from said second portion of said process liquor.

23. A galvanic cell system for removing iron from process liquor output from an inhibited oxidation scrubber comprising:
a first half-cell having a first inlet configured to receive a first portion of said process liquor, and having a first outlet;
an iron electrode in said first half-cell at which a reduction reaction occurs with said first portion of said process liquor, said first portion of said process liquor being released from said first outlet following said reduction reaction;
a second half-cell having a second inlet configured to receive a second portion of said process liquor, and having a second outlet;
an anode containing magnesium in said second half-cell at which an oxidation reaction occurs with said second portion of said process liquor, said second portion of said process liquor being released from said second outlet following said oxidation reaction;
an electrical circuit coupled between said cathode and said anode;
an ionic conductor section containing an ionic conductor for enabling a transfer of ions from said ionic conductor into each of said first and second half-cells, wherein said reduction and oxidation reactions form a redox reaction causing said iron be removed from said first portion of said process liquor by plating said iron to said iron electrode; and
a combiner, in fluid communication with each said first and second outlets, for combining said first and second portions of said process liquor and returning said combined process liquor to said scrubber.

24. An galvanic cell system as claimed in claim 23 wherein said galvanic cell generates electricity in response to said redox reaction, said electricity being provided to said electrical circuit.

25. A galvanic cell system as claimed in claim 23 wherein said redox reaction causes said magnesium from said anode to be released into solution in said second portion of said process liquor.

26. A galvanic cell system as claimed in claim 23 wherein:
said magnesium is a magnesium hydroxide paste; and
said second half-cell includes a ion permeable membrane separating said magnesium hydroxide paste from said second portion of said process liquor.

27. A galvanic cell system as claimed in claim 23 wherein said ionic conductor is calcium sulfite produced by said inhibited oxidation scrubber.

28. An electrolytic cell system for removing aluminum from process liquor output from a forced oxidation scrubber comprising:
- a first half-cell having a first inlet configured to receive a first portion of said process liquor, and having a first outlet;
- an iron electrode in said first half-cell at which a reduction reaction occurs with said first portion of said process liquor, said first portion of said process liquor being released from said first outlet following said reduction reaction;
- a second half-cell having a second inlet configured to receive a second portion of said process liquor, and having a second outlet;
- an aluminum anode in said second half-cell at which an oxidation reaction occurs with said second portion of said process liquor, said second portion of said process liquor being released from said second outlet following said oxidation reaction;
- an electrical circuit coupled between said cathode and said anode;
- an ionic conductor section containing an ionic conductor for enabling a transfer of ions from said ionic conductor into each of said first and second half-cells, wherein said reduction and oxidation reactions form a redox reaction causing said aluminum to be removed from said second portion of said process liquor by plating said aluminum to said aluminum electrode; and
- a combiner, in fluid communication with each said first and second outlets, for combining said first and second portions of said process liquor and returning said combined process liquor to said scrubber.

29. An electrolytic cell system as claimed in claim 28 wherein said redox reaction is produced by imparting electricity on said electrolytic cell from said electrical circuit.

30. An electrolytic cell system as claimed in claim 28 wherein said redox reaction causes said iron from said iron electrode to be released into solution in said first portion of said process liquor.

31. An electrolytic cell system as claimed in claim 28 wherein said ionic conductor is calcium sulfate produced by said forced oxidation scrubber.

* * * * *